(12) United States Patent
Hofner et al.

(10) Patent No.: US 10,362,918 B2
(45) Date of Patent: Jul. 30, 2019

(54) SELF-PROPELLED AND SELF-STEERING FLOOR CLEANER AND METHOD FOR CLEANING A FLOOR SURFACE

(71) Applicants: Alfred Kärcher GmbH & Co. KG, Winnenden (DE); robart GmbH, Linz (AT)

(72) Inventors: Christian Hofner, Welzheim (DE); Christian Wurm, Waiblingen (DE); Heiko Hoennige, Weissach im Tal (DE); Barbara Pfister, Weissach im Tal (DE); Markus Duenne, Vreden (DE); Norman Kohler, Reutlingen (DE); Heiko Blumhardt, Remseck (DE); Michael Schahpar, Linz (AT); Harold Artes, Ottensheim (AT)

(73) Assignees: Alfred Kärcher SE & Co. KG, Winnenden (DE); robart GmbH, Linz (AT)

( * ) Notice: Subject to any disclaimer, the term of this patent is extended or adjusted under 35 U.S.C. 154(b) by 142 days.

(21) Appl. No.: 15/342,684

(22) Filed: Nov. 3, 2016

(65) Prior Publication Data

US 2017/0071436 A1    Mar. 16, 2017

Related U.S. Application Data

(63) Continuation of application No. PCT/EP2014/059499, filed on May 8, 2014.

(51) Int. Cl.
*G05D 1/00* (2006.01)
*A47L 11/40* (2006.01)
(Continued)

(52) U.S. Cl.
CPC .......... *A47L 11/4011* (2013.01); *A47L 11/24* (2013.01); *A47L 11/30* (2013.01); *A47L 11/4036* (2013.01);
(Continued)

(58) Field of Classification Search
CPC ......... G05D 2201/0203; G05D 1/0088; G05D 1/0246; G05D 1/0248; A47L 2201/06;
(Continued)

(56) References Cited

U.S. PATENT DOCUMENTS 4,954,962 A    9/1990   Evans, Jr. et al.
5,199,996 A    4/1993   Jonas et al.
(Continued)

FOREIGN PATENT DOCUMENTS

DE    10 2008 014 912    9/2009
EP         2 702 917    3/2014
(Continued)

*Primary Examiner* — Dalena Tran
(74) *Attorney, Agent, or Firm* — Womble Bond Dickinson (US) LLP (57) ABSTRACT

A self-propelled, self-steering floor cleaner is provided, including a cleaning device with at least one cleaning unit for cleaning a floor surface of a room having at least a section of an obstacle therein that is not in contact with the floor surface, a transmission unit for emitting radiation directed at the obstacle and the floor surface, a detection unit for detecting reflected radiation and providing a detection signal, a control unit coupled to the detection unit, and a chassis for movement on the floor surface including a drive unit coupled to the control unit, it being determinable from the detection signal whether a space and a cleanable floor surface section are present underneath the obstacle, the drive unit being actuatable to move the floor cleaner for cleaning (Continued)

the floor surface section, with at least one cleaning unit. The invention also relates to a method for cleaning a floor surface.

26 Claims, 4 Drawing Sheets (51) Int. Cl.
*A47L 11/24* (2006.01)
*A47L 11/30* (2006.01)
*B25J 9/16* (2006.01)
*B25J 11/00* (2006.01)
*B25J 19/02* (2006.01)
*G05D 1/02* (2006.01)

(52) U.S. Cl.
CPC ....... *A47L 11/4038* (2013.01); *A47L 11/4041* (2013.01); *A47L 11/4044* (2013.01); *A47L 11/4052* (2013.01); *A47L 11/4061* (2013.01); *B25J 9/1666* (2013.01); *B25J 9/1697* (2013.01); *B25J 11/0085* (2013.01); *B25J 19/022* (2013.01); *B25J 19/023* (2013.01); *G05D 1/0214* (2013.01); *A47L 2201/04* (2013.01); *A47L 2201/06* (2013.01); *G05D 2201/0203* (2013.01); *Y10S 901/01* (2013.01)

(58) Field of Classification Search
CPC .... A47L 9/2826; A47L 9/2836; B25J 9/1692; Y10S 901/01
USPC .............. 700/245, 253, 250, 258; 901/1, 46; 134/18, 21, 42; 15/340.1; 318/568.12
See application file for complete search history.

(56) References Cited

U.S. PATENT DOCUMENTS

| | | | |
|---|---|---|---|
| 5,696,675 A | 12/1997 | Nakamura et al. | |
| 9,002,511 B1* | 4/2015 | Hickerson | G01S 17/026 700/245 |
| 2001/0004719 A1 | 6/2001 | Sommer | |
| 2008/0015738 A1* | 1/2008 | Casey | G05D 1/0238 700/258 |
| 2008/0084284 A1* | 4/2008 | Park | G05D 1/0227 340/436 |
| 2009/0194137 A1* | 8/2009 | Friedman | A47L 9/009 134/18 |
| 2014/0124004 A1* | 5/2014 | Rosenstein | A47L 9/2852 134/18 |
| 2014/0188325 A1* | 7/2014 | Johnson | G05D 1/0227 701/26 |
| 2014/0189977 A1 | 7/2014 | Wang et al. | |
| 2016/0324386 A1* | 11/2016 | Abe | G05D 1/0225 |

FOREIGN PATENT DOCUMENTS

| | | |
|---|---|---|
| EP | 2 702 918 | 3/2014 |
| WO | WO 2009/097354 | 8/2009 |
| WO | WO 2009/132317 | 10/2009 |

* cited by examiner

SELF-PROPELLED AND SELF-STEERING FLOOR CLEANER AND METHOD FOR CLEANING A FLOOR SURFACE

CROSS-REFERENCE TO RELATED APPLICATIONS

This application is a continuation of international application number PCT/EP2014/059499, filed on May 8, 2014, which is incorporated herein by reference in its entirety and for all purposes.

FIELD OF THE INVENTION

The present invention relates to a self-propelled and self-steering floor cleaner comprising a cleaning device with at least one cleaning unit for cleaning a floor surface of a room.

The present invention also relates to a method for cleaning a floor surface with such a floor cleaner.

BACKGROUND OF THE INVENTION

The floor surface can be cleaned autonomously with a floor cleaner of the kind mentioned at the outset. The aim is to achieve cleaning of the floor surface over as much of the surface as possible. For this purpose, it is known to clean the floor surface using predefined cleaning patterns, with the floor cleaner typically following a map of the floor surface. The map can be created ad hoc during the cleaning or be predefined by an operator. Typically designated in the map are boundaries of the room that has the floor surface and obstacles that are present inside the room. Boundaries and obstacles can also be automatically recognized and stored in the map by the floor cleaner. The obstacles are bypassed during cleaning. In order to achieve cleaning over as much of the surface as possible, it is known to move parallel to the obstacles and/or along boundaries of the floor surface, i.e., side walls of the room.

An object underlying the present invention is to provide a self-propelled and self-steering floor cleaner and a method for cleaning a floor surface with such a floor cleaner, with which a more comprehensive cleaning of the floor surface is possible.

SUMMARY OF THE INVENTION

In a first aspect of the invention, a self-propelled and self-steering floor cleaner comprises a cleaning device with at least one cleaning unit for cleaning a floor surface of a room, at least a section or sections of an obstacle located inside the room not being in contact with the floor surface. The floor cleaner further comprises a transmission unit for emitting radiation directed at the obstacle and the floor surface, in order to spatially scan these, a detection unit for detecting reflected radiation and providing a detection signal relating thereto, a control unit coupled to the detection unit, and a chassis for movement on the floor surface comprising a drive unit coupled to the control unit. It is determinable by the control unit from the detection signal whether a space is present between the obstacle and the floor surface, if so, a floor surface section located underneath the obstacle is regarded as cleanable, and the drive unit is actuatable to move the floor cleaner for cleaning the floor surface section, with at least one cleaning unit reaching into the space.

In a second aspect of the invention, a method for cleaning a floor surface of a room with a self-propelled and self-steering floor cleaner in accordance with the first aspect is provided, with at least a section or sections of an obstacle located inside the room not being in contact with the floor surface. Radiation is emitted in the direction of the obstacle and the floor surface in order to spatially scan these, reflected radiation is detected and a detection signal relating thereto is provided. It is determined whether a space is present between the obstacle and the floor surface and, if so, a floor surface section located underneath the obstacle is regarded as cleanable and is cleaned, with at least one cleaning unit of the floor cleaner reaching into the space.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a self-propelled and self-steering floor cleaner comprising a cleaning device with at least one cleaning unit for cleaning a floor surface of a room, at least a section or sections of an obstacle located inside the room not being in contact with the floor surface. The floor cleaner further comprises a transmission unit for emitting radiation directed at the obstacle and the floor surface, in order to spatially scan these, a detection unit for detecting reflected radiation and providing a detection signal relating thereto, a control unit coupled to the detection unit, and a chassis for movement on the floor surface comprising a drive unit coupled to the control unit. It is determinable by the control unit from the detection signal whether a space is present between the obstacle and the floor surface, if so, a floor surface section located underneath the obstacle is regarded as cleanable, and the drive unit is actuatable to move the floor cleaner for cleaning the floor surface section, with at least one cleaning unit reaching into the space.

Incorporated in the present invention is the concept that an obstacle may be present inside the room, at least sections of which do not contact the floor surface, but which is of such low height that the floor cleaner cannot move under the obstacle in order to clean the floor surface underneath the obstacle. Shelves, for example, that are positioned on the floor surface with shelf feet or a shelf base located behind an outer contour of the obstacle constitute an obstacle, at least a section or sections of which does/do not contact the floor surface. Also conceivable is an obstacle in the form of shelves that are mounted on a side wall of the room and are not in contact with the floor surface. With the floor cleaner in accordance with the invention, radiation is directed at the obstacle and the floor surface for spatial scanning and is detected with the detection unit, which provides the control unit with a detection signal relating thereto. From the detection signal, the control unit can determine whether a space is present between the obstacle and the floor surface. If this is the case, the control unit assumes that a floor surface section underneath the obstacle can be cleaned. The drive unit can be actuated to move the floor cleaner and the floor surface section can be cleaned. As the floor cleaner itself cannot move under the obstacle, at least one cleaning unit reaches into the space and contacts the floor surface.

It proves advantageous that by spatially scanning the obstacle and the floor surface it can be ascertained in a non-contacting manner whether there are cleanable floor surface sections underneath obstacles. Movement of the floor cleaner resulting in collision with the obstacle can thereby be avoided. With knowledge of the cleanable floor surface section, it is, furthermore, possible, in order to clean it, to position the floor cleaner so close to the obstacle that it does not (yet) contact it, but with at least one cleaning unit reaches as far as possible into the space in order to clean the floor surface over as much of the surface as possible.

It is possible to determine whether there is a cleanable floor surface section underneath an obstacle, in particular, without a priori knowledge of the presence of an obstacle. By detecting the radiation spatially scanning the room, the floor cleaner, preferably while moving over the floor surface, can detect the presence of obstacles and simultaneously determine whether there are cleanable floor surface sections underneath these.

Additionally or alternatively, it is conceivable that a map of the room in which obstacles are designated is stored in the floor cleaner. The floor cleaner can approach obstacles directly in order to determine floor surface sections underneath these, if present.

"Reflection" of radiation is, in this case, not limited to retroreflection, but does include this. In this case, reflection includes, in particular, also the scattering of radiation at an object such as the floor surface or the obstacle.

It is advantageous for the relative position of the floor cleaner and the floor surface section to be determinable by the control unit. The floor surface section can thereby be directly approached and cleaned by the floor cleaner.

It is expedient for the floor cleaner to comprise a storage unit in which a map of the room is storable, and a localization unit for localizing the position of the floor cleaner on the floor surface, and for the position of the floor surface section on the floor surface to be determinable, and the floor surface section to be designatable as cleanable in the map, with the floor surface section preferably being designatable as positioned underneath the obstacle or an obstacle. The determination that a floor surface section underneath an obstacle is cleanable can be stored by recordal and designation in the map for future cleaning operations. During subsequent cleaning of the floor surface, the floor cleaner can clean the floor surface section, in order to perform cleaning of the floor surface over as much of the surface as possible. It is advantageous for the characteristic of the floor surface section as positioned underneath the obstacle to also be stored in order that the floor cleaner knows that it is not possible to move under the obstacle.

It is also conceivable for it to be determined by the floor cleaner during subsequent cleaning whether the position of the obstacle on the floor surface corresponds to the position stored in the map. For example, the obstacle, such as shelves, could have been repositioned. If this is determined by the floor cleaner by spatial scanning of the floor surface and the obstacle, the map can be updated with the changed position of the obstacle. The floor surface section designated in the map can then also be updated.

Advantageously, the height of the space is determinable by the control unit, and the floor surface section is only cleaned if the height exceeds a minimum height. The minimum height can be predetermined or predeterminable. For example, the minimum height corresponds to the height of at least one cleaning unit in order to ensure that at least one cleaning unit can reach into the space. The minimum height can, however, differ from the height of the lowest cleaning unit and be less than this. This is, for example, the case when as cleaning unit a circular broom with inclined cleaning bristles is used, which are able to reach into the space without the circular broom being positioned in its entirety underneath the obstacle.

Preferably, the extent of the floor surface section underneath the obstacle is determinable in the direction of propagation of the radiation by the control unit. In this case, this can be understood, in particular, as meaning that the "depth" of the space in the direction of propagation of the radiation is determined. The control unit can use this information to determine how far a cleaning unit can reach into the space.

The above statements show that in an advantageous embodiment of the floor cleaner, in particular, a three-dimensional measuring system can be present for spatially scanning the obstacle and the floor surface. In particular, the relative position of the floor cleaner and the obstacle and also of the floor surface section can be determined, the height of the space and/or the depth of the space.

It is advantageous if as a function of the determined extent, the floor cleaner is movable relative to the obstacle such that the at least one cleaning unit reaches to a different extent into the space. For example, depending on the extent of the floor surface section, the floor cleaner can be positioned at a different proximity to the obstacle.

Alternatively or additionally, it may be provided that as a function of the determined extent, at least one cleaning unit is transferable relative to the floor cleaner to a different distance so that the at least one cleaning unit reaches to a different extent into the space. At least one cleaning unit can be moved out relative to the remaining floor cleaner. This will be discussed in greater detail hereinbelow. Depending on the depth of the space, the cleaning unit can be moved out to a different extent, in order to ensure cleaning over as much of the surface as possible.

In an advantageous embodiment, it is expedient for the floor cleaner to comprise a combined transmission and detection unit for emitting and detecting the radiation. The transmission unit emitting the radiation may be simultaneously configured to detect the radiation. For example, a laser scanner, in particular, a 3D-laser scanner, is used.

It may be provided that the transmission unit is an ultrasonic transmission unit with which ultrasonic radiation is emittable, and that the detection unit is an ultrasonic detection unit. Accordingly, in this case, "radiation" is not limited to electromagnetic radiation, but, in particular, does include this. Furthermore, in this case, "radiation" also includes ultrasound where waves can propagate by way of the compression of a medium, in particular, air, and its description is subject to laws similar to those applying to electromagnetic radiation (e.g. with respect to speed of propagation, wavelength, frequency, etc.).

Alternatively or additionally, it may be provided that the transmission unit is an optical transmission unit with which optical and, in particular, infrared radiation and/or visible radiation is emittable, and that the detection unit is an optical detection unit.

In an advantageous embodiment of the floor cleaner, the transmission unit comprises a laser light source, for example, an infrared laser or a laser for the emission of visible light. Laser light radiation can be projected by the transmission unit onto the obstacle and the floor surface. By reflection, laser light radiation can be detected by the detection unit. In practice, it proves constructionally simple and reliable to use a laser light source for spatially scanning the obstacle and the floor surface.

In an advantageous implementation of the floor cleaner, it proves expedient for the detection unit to be a digital camera or to comprise a digital camera, with which it is possible to take pictures of the obstacle and the floor surface, a component originating from the reflected radiation being determinable in the pictures. This allows constructionally simple and cost-effective manufacture of the floor cleaner. A high-priced 3D-laser scanning system can be saved if a digital camera is used for detecting the radiation. Self-propelled and self-steering floor cleaners usually comprise a digital camera for recognizing obstacles and floor surface boundaries, for example, for localizing and/or for creating a map. In particular, this digital camera can be used to take pictures of the obstacle and the floor surface and to determine signal components in these pictures, which originate from the radiation of the transmission unit. For this purpose, it may be provided that corresponding image processing algorithms are stored for execution in the control unit, which examine the pictures for components of reflected radiation. It will be clear that the digital camera is calibrated such that the control unit can determine from these components the presence of a space between the obstacle and the floor surface.

It is expedient for the transmission unit to be configured to emit the radiation linearly. A linear signal, for example, of a laser light source can be projected onto the obstacle and the floor surface. If a space is present underneath the obstacle, this is recognizable by the detection unit, for example, by a spatial interruption or a spatial offset of reflected radiation because the radiation propagates further into the space than up to the obstacle.

It proves advantageous for the transmission unit to be configured to emit the radiation in the shape of a fan.

Expediently, the transmission unit is configured to emit the radiation in at least one plane.

Preferably, the transmission unit is configured to emit the radiation in a vertical plane.

Position and orientation details such as, for example, "above", "below", "vertical", "horizontal" or the like are, in this case, to be understood as relating to use of the floor cleaner on the floor surface in accordance with the specifications. The floor cleaner defines a contact plane which coincides with a plane of the floor surface, this being regarded as horizontally aligned. "Longitudinal direction" relates to a main direction of movement of the floor cleaner during straight-ahead travel in a straight line.

In the last-mentioned advantageous embodiment, it may be provided, in particular, that the transmission unit is configured to emit the radiation in a plane which is aligned at an incline and, in particular, transversely to a longitudinal direction of the floor cleaner. The floor cleaner usually moves in the longitudinal direction during straight-ahead travel. Owing to emission of the radiation in a plane at an incline and, in particular, transversely to the longitudinal direction, obstacles and the floor surface alongside the floor cleaner can be spatially scanned.

Alternatively or additionally, it may be provided that radiation is emittable in a plane inclined relative to the horizontal in the direction towards the floor surface, a line of intersection of the plane of the emission with the horizontal being aligned transversely to a longitudinal direction of the floor cleaner.

In the last-mentioned advantageous embodiment, it is provided, in particular, that during straight-ahead travel of the floor cleaner, the radiation is directed at an area located in front of the floor cleaner. In particular, the radiation can be directed in a downwardly inclined plane at the floor surface in front of the floor cleaner. When the floor cleaner approaches an obstacle, a floor surface section underneath the obstacle is first subjected to the radiation. When the floor cleaner moves further, the radiation is projected onto the obstacle. The control unit can conclude the presence of the floor surface section from the resulting difference in the height of the reflected radiation.

The above description, therefore, includes, in this case, in particular, the information that the transmission unit and the detection unit emit radiation and detect reflected radiation, respectively, for light-section usage. The transmission unit and the detection unit can emit radiation and detect reflected radiation, respectively, by means of a light-section method.

The transmission unit and/or the detection unit can be held immovably or movably, for example, displaceably and/or pivotably, on the floor cleaner.

Advantageously, the drive unit is actuatable to move the floor cleaner during the cleaning of the floor surface section at a predetermined or predeterminable distance from the obstacle. In particular, it may be provided to move the floor cleaner during the cleaning of the floor surface section parallel to the obstacle.

It has already been mentioned that advantageously during a movement of the floor cleaner cleaning the floor surface, radiation is emittable and detectable and the presence of the space is determinable.

The floor cleaner may comprise a plurality of cleaning units. Examples of cleaning units are a circular broom, a sweeping roller, a scrubbing roller, a floor cleaning head with a plurality of scrubbing rollers, a disc brush, a suction nozzle or a dirt pick-up device, for example, in the form of a suction bar.

In an implementation of the floor cleaner, it proves advantageous for at least one circular broom with cleaning bristles and/or a dirt pick-up device to be provided as cleaning unit, the cleaning bristles and the dirt pick-up device, respectively, protruding at least partially over an outer contour of the floor cleaner in order to reach into the space. The cleaning bristles and the dirt pick-up device, respectively, can thereby reach into the space, even when the floor cleaner is at a distance from the obstacle. A housing of the floor cleaner is used, for example, to define the outer contour.

It is expedient for at least one cleaning unit to be held so as to be movable on the floor cleaner and to be able to be moved out relative to a housing of the floor cleaner in order to reach into the space. In particular, this makes it possible for the cleaning unit that is able to be moved out to be transferred from a position close to the housing to a position far from the housing, in relation to a housing defining the outer contour of the floor cleaner, and vice versa. In the position close to the housing, it may be provided that the cleaning unit does not protrude or only protrudes partially over the outer contour. In the position far from the housing, the cleaning unit can protrude to a greater extent over the outer contour than in the position close to the housing. The cleaning unit can be moved out and thereby reach as deeply as possible into the space in order to achieve cleaning over as much of the surface as possible.

The at least one cleaning unit is, for example, displaceably and/or pivotably mounted on the floor cleaner for moving out.

It may be provided that a cleaning unit which, in particular, can be moved out (for example, in the form of a side brush) is mounted on the floor cleaner so as to be movable counter to the action of an elastic element. For example, in the event of a collision with the obstacle, the cleaning unit can be resiliently pivoted counter to the action so as to prevent damage. This is, for example, advantageous when the cleaning unit reaches into the space in order to clean the floor surface section and contacts the obstacle at a section contacting the floor surface. For example, this is a shelf foot or a shelf base, upon collision with which the cleaning unit is pivoted.

Advantageously, the floor cleaner comprises a drive unit coupled to the control unit for moving out the at least one cleaning unit relative to the floor cleaner. In particular, if the floor cleaner is positioned at the obstacle, the control unit can activate the drive unit to move out the cleaning unit so that it reaches into or reaches deeper into the space. After the floor surface section has been cleaned, the drive unit can be activated again in order to move in the cleaning unit.

The floor cleaner is, for example, a scrubbing-suction machine, a sweeping-suction machine, a sweeping-scrubbing-suction machine or a suction machine.

The present invention further relates to a method for cleaning a floor surface of a room with a self-propelled and self-steering floor cleaner of the aforementioned kind, at least a section or sections of an obstacle located inside the room not being in contact with the floor surface. Radiation is emitted in the direction of the obstacle and the floor surface in order to spatially scan these, reflected radiation is detected and a detection signal relating thereto is provided. It is determined whether a space is present between the obstacle and the floor surface and, if so, a floor surface section located underneath the obstacle is regarded as cleanable and is cleaned, with at least one cleaning unit of the floor cleaner reaching into the space.

The advantages mentioned hereinabove in conjunction with the explanation of the floor cleaner in accordance with the invention can also be achieved in the performance of the method in accordance with the invention. In this connection, reference is made to the above explanations.

The features of advantageous embodiments of the floor cleaner can, of course, also be used to define advantageous embodiments of the method in accordance with the invention. Accordingly, the features of the cleaner can be implemented in the performance of the method. In this connection, too, reference is made to the above statements in order to avoid repetitions.

FIGS. 1 to 4 show an advantageous embodiment of a floor cleaner designated by reference numeral 10. The floor cleaner 10 is of self-propelled and self-steering configuration and is, therefore, a so-called robotic cleaner, for cleaning a floor surface autonomously. In this case, the floor cleaner 10 is configured as a scrubbing-suction machine.

Figure 1:
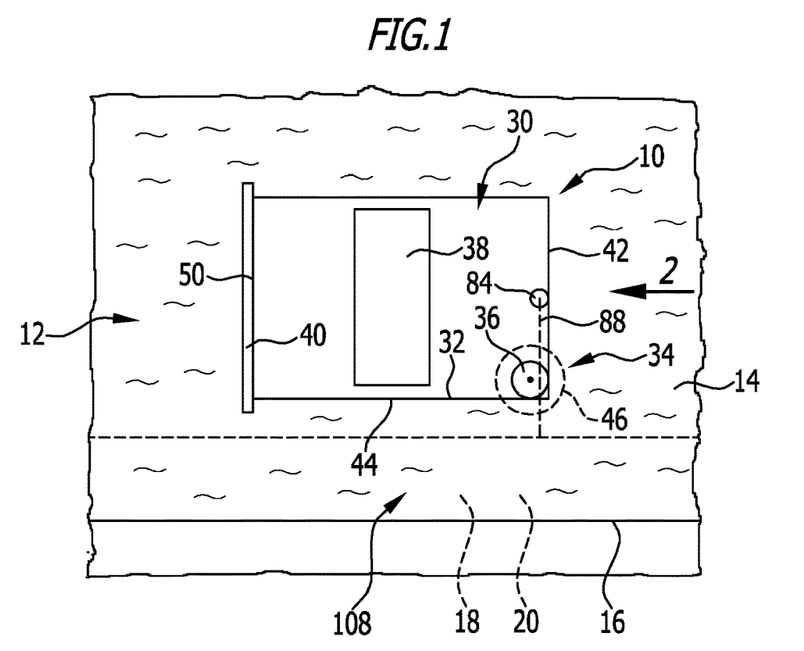
FIG. 1 shows a schematic plan view of a floor cleaner in accordance with the invention, which is positioned on a floor surface and scans an obstacle.

The floor cleaner 10 is positioned in a room 12 with a floor surface 14. A boundary at the side of the room 12 is also shown in the form of a side wall 16. An obstacle 18 located inside the room 12 is held at the side wall 16. In this case, the obstacle 18 is, by way of example, in the form of wall shelves 20. The wall shelves 20 are not in contact with the floor surface 14. Accordingly, they do not stand by means of shelf feet or a base on the floor surface 14. However, this is not absolutely necessary for the definition, comprehension and performance of the present invention, but merely serves to explain the invention more simply.

A space 22 whose height is symbolized by a double arrow 24 (FIG. 2) is present underneath the wall shelves 20. In this case, the height 24 is understood as being, in particular, the distance of the wall shelves 20 from the floor surface 14.

Figure 4:
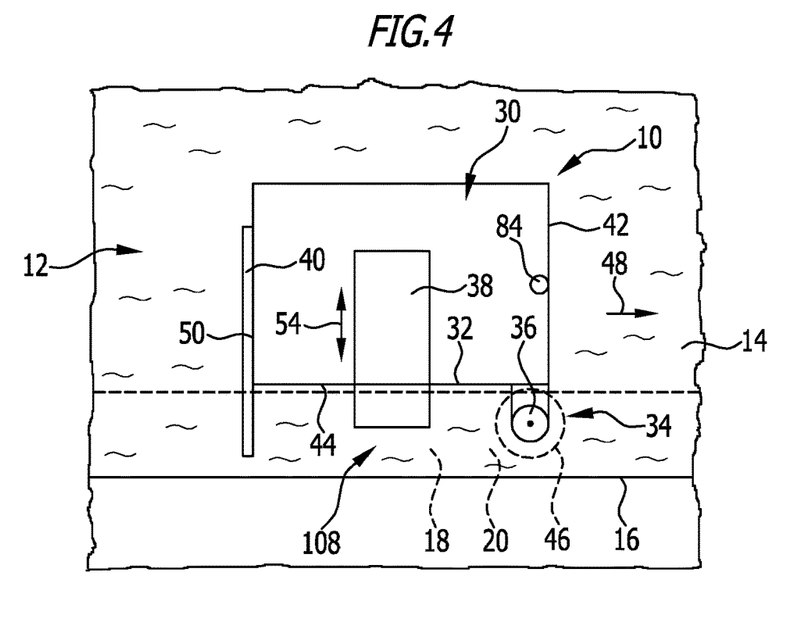
FIG. 4 shows the floor cleaner from FIG. 1 while cleaning a floor surface section located underneath the obstacle.

The space 22 has an extent symbolized by a double arrow 26. The extent 26 is referred to hereinbelow as "depth" 26 of the space 22. In this case, the depth 26 is predetermined by the distance of a front side 28 of the wall shelves 20 from the side wall 16. In FIGS. 1 and 4, a dashed line running parallel to the side wall 16 symbolizes the course of the front side 14.

The floor cleaner 10 comprises a housing 30 which defines an outer contour 32 of the floor cleaner 10. A cleaning device 34 is held on an underside of the housing 30. The cleaning device 34 comprises at least one cleaning unit. In this case, cleaning units take the form of a circular broom 36, a floor cleaning head 38 and a dirt pick-up device 40. The circular broom 36 is positioned at a front side 42 of the floor cleaner and at a right-hand side 44 of the floor cleaner and has cleaning bristles 46 aligned at an incline to a vertical line.

Position and orientation details relate, as mentioned hereinabove, to use of the floor cleaner 10 in accordance with the specifications on a floor surface 14 which is regarded as horizontal and to a longitudinal direction 48. The longitudinal direction 48 corresponds to a main direction of movement of the floor cleaner 10 during straight-ahead travel in a straight line.

The floor cleaning head 38 is arranged, for example, at the center of the floor cleaner 10 in the longitudinal direction 48. It comprises, for example, at least one scrubbing roller which is rotatable about an axis transversely to the longitudinal direction 48. A cleaning liquid such as, for example, water can also be applied to the floor surface 14 by way of the floor cleaning head 38.

The dirt pick-up device 40, configured as suction bar, is arranged at a rear side 50 of the floor cleaner 10. By means of the suction bar, the mixture of cleaning liquid and dirt can be picked up from the floor surface 14 under the action of a suction unit not shown in the drawings.

The circular broom 36 is held on the housing such that the cleaning bristles 46 project in some areas thereof over the outer contour 32 at the right-hand side.

Figure 3:
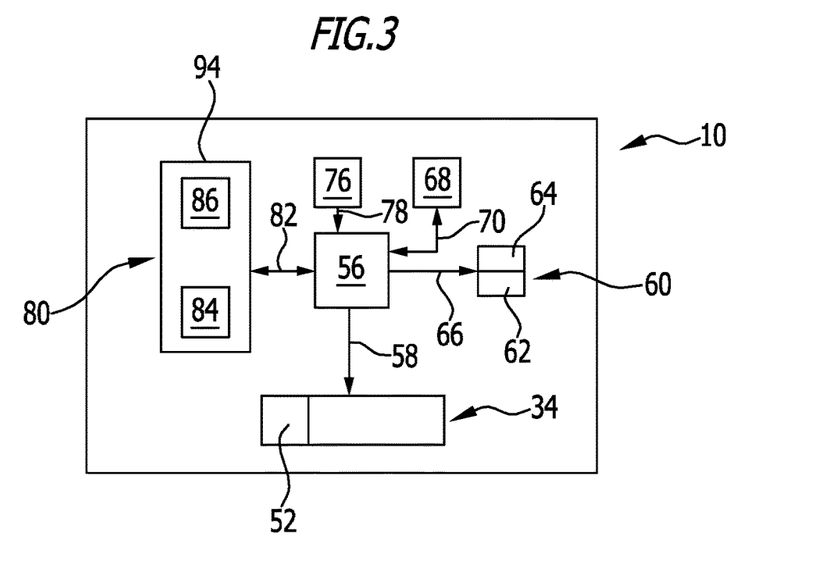
FIG. 3 shows a schematic block diagram of the floor cleaner from FIG. 1.

FIG. 3 shows a schematic block diagram of the floor cleaner 10, in which the cleaning device 34 is represented in its entirety. A drive unit 52 is also shown as component of the cleaning device 34. At least one cleaning unit can be moved out relative to the housing 30 by means of the drive unit 52. In particular, the cleaning unit, which is adapted to be moved out, is mounted on the housing 30 so as to be displaceable transversely to the longitudinal direction 48. Alternatively or additionally, a pivotable mounting of the cleaning unit may be provided. In the case of a plurality of cleaning units, a pivotable mounting of one cleaning unit and a displaceable mounting of a further cleaning unit may be provided.

In this example, which is not limiting, both the circular broom 36 and the floor cleaning head 38 and also the dirt pick-up device 40 can be moved out transversely to the longitudinal direction 48. They can be transferred from a position close to the housing to a position far from the housing. In the position far from the housing, they protrude over the outer contour 32 to a greater extent than in the position close to the housing. With reference to the dirt pick-up device 40, this is to be understood, in this case, as meaning that the dirt pick-up device 40 is arranged at a greater distance from the housing 30 and protrudes further over the housing 30 transversely to the longitudinal direction than when it assumes the position close to the housing.

FIG. 4 shows the cleaning units in a position in which they are moved out and symbolizes by means of a double arrow 54 their displacement relative to the housing 30.

The floor cleaner 10 comprises a control unit 56 which is coupled by a control line 58 to the cleaning device 34 to actuate the drive unit 52. The control unit 56 comprises, for example, a microprocessor. Computer programs, for example, are stored in the control unit 56 for performance.

The floor cleaner 10 further comprises a chassis 60, shown only schematically in FIG. 3, with drive wheels or at least one steering roller 62 and a drive unit 64. The drive unit 64 is actuatable by the control unit 56 by way of a control line 66. This allows the floor cleaner 10 to be moved, as desired, over the floor surface 14.

The floor cleaner 10 further comprises a storage unit 68 which is coupled to the control unit 56 by a bidirectional line 70. The storage unit 68 could also be integrated in the control unit 56. In particular, a map 72 of the room 12 and, therefore, of the floor surface 14 is stored in the storage unit 68. The map 72 is stored, in particular, so as to be changeable in the storage unit 68. Features of the room 12 are provided with identical reference numerals in the map 72. Accordingly, the map 72 also comprises the floor surface 14 and the side wall 16. A further side wall 74 of the room 12 is also shown.

The floor cleaner 10 further comprises a localization unit 76 which is coupled to the control unit 56 by a signal line. The localization unit 76 could also be integrated in the control unit 56.

By means of the localization unit 76, the control unit 56 can determine the position of the floor cleaner 10 in the room 12 using the map 72.

The floor cleaner 10 further comprises a sensor unit 80. The sensor unit 80 is coupled to the control unit 56 by a bidirectional line 82. The sensor unit 80 comprises a transmission unit 84 and a detection unit 86 and forms, in particular, a 3D-measuring system.

The transmission unit 84 is, in this case, configured to emit radiation, in particular, optical radiation, especially infrared light and/or visible light. For this purpose, the transmission unit 84 comprises, for example, a laser light source. The transmission unit 84 is held, in this case, at the front side 42 on the housing 30, but could also be positioned at a different location on the floor cleaner 10.

Figure 2:
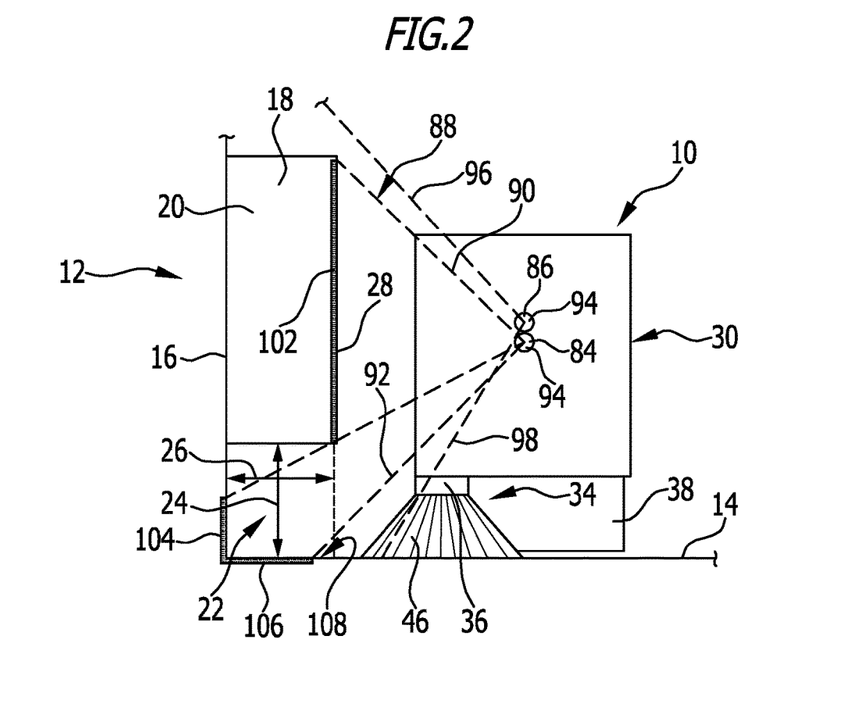
FIG. 2 shows a schematic representation in the viewing direction of arrow "2" in FIG. 1.

The transmission unit 84 is so configured that radiation can be emitted linearly in a plane 88. In FIG. 1, the plane 88 is symbolized by dashed lines. In this case, the plane 88 is aligned transversely to the longitudinal direction 48. Accordingly, the radiation is emitted by the transmission unit 84 in the transverse direction of the floor cleaner 10. The transmission unit 84 is so configured that the radiation is emitted in a vertical plane 88. The radiation is emitted, for example, in the shape of a fan. FIG. 2 shows edges 90, 92, symbolized by dashed lines, of the emission field. The included angle is, in this case, approximately 90°, but could also be different.

The detection unit 86 is configured, in this case, as digital camera 94. The digital camera 94 is held at the front side 42 on the housing 30. However, it could also be arranged at a different position on the floor cleaner 10. Pictures of the room 12 can be taken with the digital camera 94, for example, for navigating the floor cleaner and for creating the map 72. The field of vision of the digital camera 94 is represented schematically by dashed lines symbolized by reference numerals 96, 98. The field of vision is aligned, in particular, transversely to the longitudinal direction 48, in the direction in which the radiation is emitted by the transmission unit 84. The field of vision of the digital camera 94 is preferably of such size that the radiation emitted by the transmission unit 84 into the room 12, including a projection of laser light onto objects located in the room 12 and the floor surface 14, can be fully detected.

The mode of operation of the floor cleaner 10 and an advantageous embodiment of a method in accordance with the invention will be explained hereinbelow with reference, in particular, to FIGS. 1, 2 and 4.

While the floor cleaner 10 moves over the floor surface 14, cleaning or not cleaning, the transmission unit 84 emits radiation into the room 12 transversely to the longitudinal direction 48. The radiation is directed at obstacles such as the obstacle 18 in the form of the wall shelves 20 and the floor surface 14. Accordingly, a linear light signal is projected onto objects subjected to the radiation, so that these can be spatially scanned.

In FIG. 2 this is represented, by way of example, by a projection line 102 at the wall shelves 20. The projection line 102 is emphasized by increased line thickness. Furthermore, a projection line 104 at the side wall 16 is emphasized in FIG. 2 by increased line thickness. A projection line 106 on the floor surface 14 underneath the wall shelves 20 is emphasized by increased line thickness. Above the projection line 104, no radiation impinges on the side wall 16 because the side wall 16 is shadowed in this area by the wall shelves 20.

When the radiation impinges on an object, it is reflected. Reflection is understood, in this case, as being not only a retroreflection, but, in particular, also a scattering of the radiation.

The reflected radiation can be detected by the digital camera 94. The digital camera 94 takes pictures of the room 12 at preferably regular intervals. In this case, pictures of the wall shelves 20 and sections of the floor surface 14 are taken. The pictures are transmitted to the control unit 56 as detection signal. By means of image processing algorithms stored for execution in the control unit 56, components originating from the reflected radiation can be determined in the pictures.

From the components originating from the radiation, the control unit 56 can determine the position of the projection lines 102, 104, 106 relative to the floor cleaner 10. This enables, in particular, the positions of the projection lines 102, 104, 106 in the room to be determined.

The control unit 56 can thereby detect that the space 22 is present underneath the wall shelves 20. The height 24 of the space can be determined. Furthermore, it is possible to determine the depth 26 of the space 22. The depth of the space can be determined in the direction of propagation of the radiation and, in this example, corresponds to the depth 26.

The control unit 56 can thereby detect that there is a floor surface section 108 underneath the wall shelves 20, which can be cleaned. Insofar as the height 24 exceeds a minimum height allowing at least one cleaning unit to reach into the space 22, the floor surface section 108 is regarded as cleanable and is cleaned by the floor cleaner 10.

The floor surface section 108 can be designated as cleanable in the map 72. The floor surface section 108 is designated by a dashed-line contour 110 in the map 72. In addition, the information that this floor surface section 108 is located underneath an obstacle 18 can be stored in the map. When subsequently cleaning the floor surface 14, this information can be used for targeted approaching and cleaning of the floor cleaning section 108.

Figure 5:
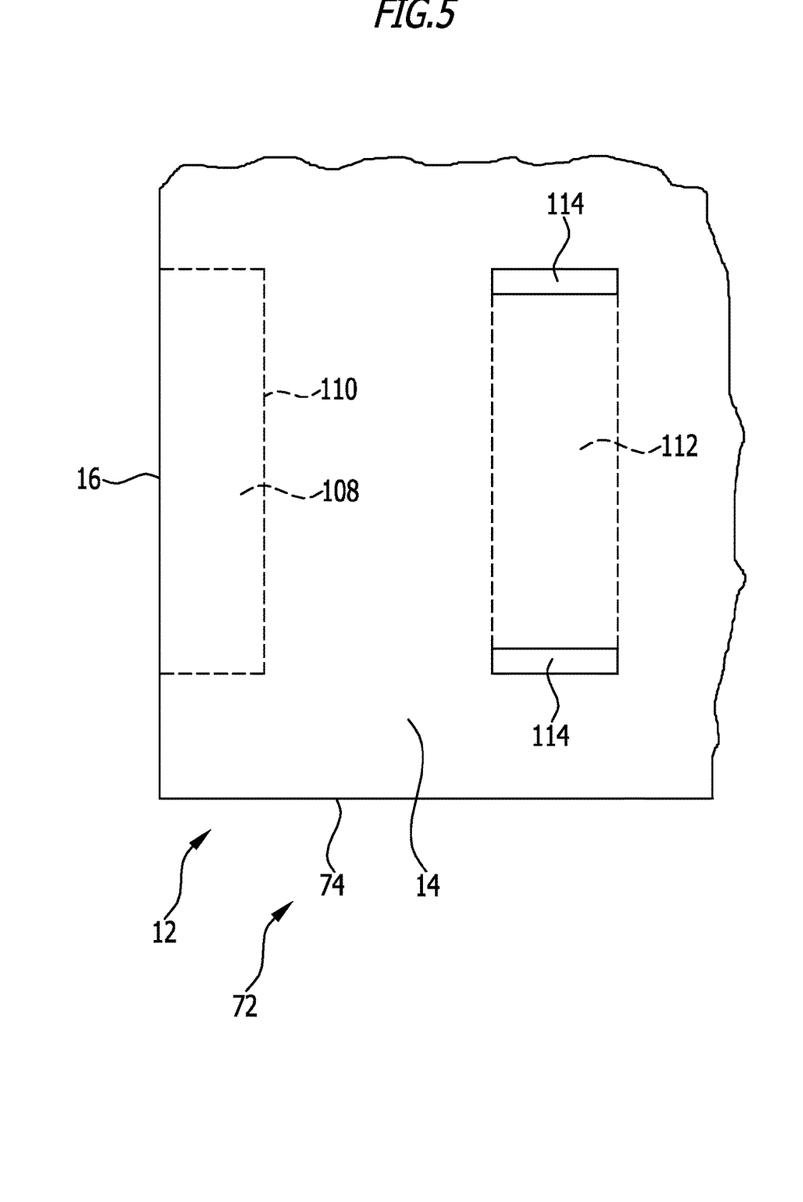
FIG. 5 shows a partial representation of a map of the room with the floor surface, which is stored in a storage unit of the floor cleaner from FIG. 1.

FIG. 5 further symbolizes a floor surface section 112 which is also stored as located underneath an obstacle and as cleanable in the map 72. The floor surface section 112 is also represented by dashed-line designation. For example, the floor surface section 112 is located underneath an obstacle such as standing shelves. The standing shelves have, for example, shelf feet which are in contact with the floor surface 14. Accordingly, the standing feet are designated in the map 72 (by reference numeral 114) as areas in which the floor surface 14 cannot be cleaned.

To clean the floor surface section 108, the control unit 56 can actuate the chassis 60 so that the floor cleaner 10 is preferably moved parallel to the wall shelves 20. The floor cleaner 10 can be positioned so close to the wall shelves 20 that the cleaning bristles 46 reach into the space 22 in order to clean at least sections of the floor surface section 108 (this is not shown in the drawings).

It is, however, advantageous for at least one cleaning unit to be moved out, as explained hereinabove, relative to the housing 30. This is shown in FIG. 4, in which the floor cleaner 10 is positioned as close as possible to the wall shelves 20 without contacting them. By actuating the drive unit 52, in this example, the circular broom 36, the floor cleaning head 38 and the dirt pick-up device 40 are displaced in the transverse direction 54 relative to the housing 30, so that they reach into the space 22. This enables the floor surface section 108 to be swept with the circular broom 36, to be scrubbed with the floor cleaning head 38 using cleaning liquid, and the mixture of dirt and cleaning liquid to be picked up with the dirt pick-up device 40.

After the floor surface section 108 has been cleaned, the cleaning units can be displaced from the position far from the housing into the position close to the housing again.

It is even possible to choose the reach-in depth of the respective cleaning unit that has moved out as a function of the determined depth 26 of the floor surface section 108. The control unit 56 can actuate the drive unit such that the respective cleaning unit is displaced only partly or to the full extent in order to reach fully or as far as possible into the space 22 or only so far that no cleaning unit contacts an object delimiting the space 22, in this case, for example, the side wall 16.

With use of the floor cleaner 10 in accordance with the invention and performance of the method in accordance with the invention, a more comprehensive cleaning of the floor surface 14 over more of the surface is achievable.

A further floor cleaner 120 in accordance with the invention, shown in FIGS. 6 and 7, will be explained hereinbelow. The same reference numerals are used for features or components of the floor cleaners 10 and 120, which are the same or have the same effect. The advantages achievable with the floor cleaner 10 can also be achieved with the floor cleaner 120. A method in accordance with the invention can also be carried out with the floor cleaner 120. Only the main differences will be explained hereinbelow.

In the floor cleaner 120, the radiation emitted by the transmission unit 84 is emitted in a plane 122. The plane 122 is inclined relative to the horizontal and directed at the floor surface 14. A line of intersection of the plane 122 with the horizontal is aligned transversely to the longitudinal direction 48 (perpendicularly to the drawing plane in FIGS. 6 and 7). During straight-ahead travel of the floor cleaner, the radiation is directed at an area located in front of the floor cleaner.

Figure 6:
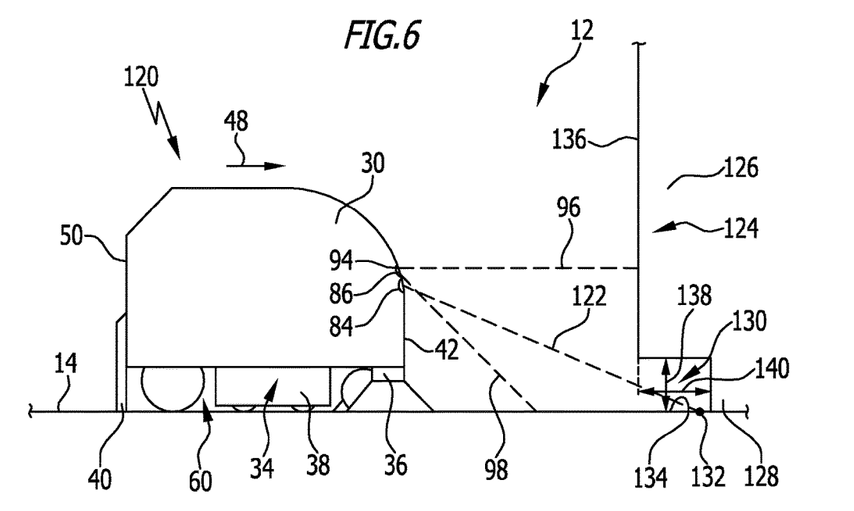
FIG. 6 shows a schematic side view of a second advantageous embodiment of a floor cleaner in accordance with the invention approaching an obstacle.
Figure 7:
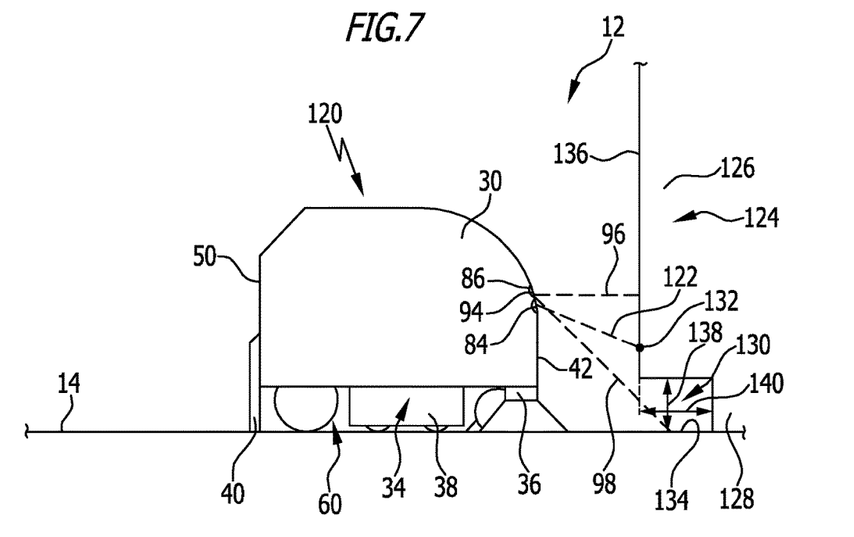
FIG. 7 shows the floor cleaner from FIG. 6 at a later point in time at a shorter distance from the obstacle.

Standing shelves 126 with a shelf base 128 are shown, by way of example, as obstacle 124 in FIGS. 6 and 7. The standing shelves 126 are in contact with the floor surface 14 by way of the shelf base 128. A space 130 is present in sections underneath the standing shelves 126.

The presence of the space 130 can be detected, for example, in the following way with the floor cleaner 120. The floor cleaner 120 moves towards the standing shelves 126. A projection line 132 of the laser light lies on the floor surface 14 if the distance of the floor cleaner 120 from the standing shelves 126 is sufficiently large.

With the floor cleaner 120, too, reflected radiation is determined by the analysis of pictures of the digital camera 94 by the control unit 56. In the case of the floor cleaner 120, the digital camera 94 is also directed forwards with the field of vision.

When the distance of the floor cleaner 120 from the standing shelves 126 is reduced, the projection line 132 on the floor surface 14 moves into a floor surface section 134 represented underneath the standing shelves 126 (this is shown in FIG. 6). Upon further approaching of the floor cleaner 120, the radiation is shadowed by the standing shelves 126 and can no longer reach as far as the floor surface 14. Accordingly, the projection line 132 lies at a front side 136 of the standing shelves 126 (FIG. 7).

The control unit 56 can determine from the different position of the projection line 132, also taking into consideration the movement of the floor cleaner 120, the relative position of the standing shelves 126 and the floor cleaner 120. This also allows the presence of the space 130 underneath the standing shelves 126 to be detected. As in the previous example, a height 138 and a depth 140 of the space 130 can also be determined. The presence of the floor surface section 134 is also detected. This can be cleaned, for example, in one of the aforementioned ways with at least one cleaning unit.

The invention claimed is:

1. A self-propelled and self-steering floor cleaner comprising a cleaning device with at least one cleaning unit for cleaning a floor surface of a room, at least a section or sections of an obstacle located inside the room not being in contact with the floor surface, the obstacle being of such low height that the floor cleaner cannot move under the obstacle, the floor cleaner further comprising a transmission unit for emitting radiation directed at the obstacle and the floor surface, in order to spatially scan these, a detection unit for detecting reflected radiation and providing a detection signal relating thereto, a control unit coupled to the detection unit, and a chassis for movement on the floor surface comprising a drive unit coupled to the control unit, it being determinable by the control unit from the detection signal whether a space is present between the obstacle and the floor surface, if so, a floor surface section located underneath the obstacle being regarded as cleanable, and the drive unit being actuatable to move the floor cleaner for cleaning the floor surface section, with at least one cleaning unit reaching into the space, wherein the drive unit is actuatable to move the floor cleaner during cleaning of the floor surface section at a predetermined or predeterminable distance from the obstacle.

2. The floor cleaner in accordance with claim 1, wherein the relative position of the floor cleaner and the floor surface section is determinable by the control unit.

3. The floor cleaner in accordance with claim 1, wherein the floor cleaner comprises a storage unit in which a map of the room is storable, and a localization unit for localizing the position of the floor cleaner on the floor surface, and wherein the position of the floor surface section on the floor surface is determinable, and the floor surface section is designatable in the map as cleanable.

4. The floor cleaner in accordance with claim 3, wherein the floor surface section is designatable in the map as positioned underneath the obstacle.

5. The floor cleaner in accordance with claim 1, wherein the height of the space is determinable by the control unit, and wherein the floor surface section is only cleaned if the height exceeds a minimum height.

6. The floor cleaner in accordance with claim 1, wherein the extent of the floor surface section underneath the obstacle is determinable in the direction of propagation of the radiation by the control unit.

7. The floor cleaner in accordance with claim 6, wherein as a function of the determined extent, the floor cleaner is movable relative to the obstacle such that the at least one cleaning unit reaches to a different extent into the space and/or wherein as a function of the determined extent, at least one cleaning unit is transferable relative to the floor cleaner to a different distance so that the at least one cleaning unit reaches to a different extent into the space.

8. The floor cleaner in accordance with claim 1, wherein the floor cleaner comprises a combined transmission and detection unit for emitting and detecting the radiation.

9. The floor cleaner in accordance with claim 1, wherein the transmission unit is an ultrasonic transmission unit with which ultrasonic radiation is emittable, and wherein the detection unit is an ultrasonic detection unit.

10. The floor cleaner in accordance with claim 1, wherein the transmission unit is an optical transmission unit with which optical and, in particular, infrared radiation and/or visible radiation is emittable, and wherein the detection unit is an optical detection unit.

11. The floor cleaner in accordance with claim 1, wherein the transmission unit comprises a laser light source.

12. The floor cleaner in accordance with claim 1, wherein the detection unit is a digital camera or comprises a digital camera, with which it is possible to take pictures of the obstacle and the floor surface, a component originating from the reflected radiation being determinable in the pictures.

13. The floor cleaner in accordance with claim 1, wherein the transmission unit is configured to emit the radiation linearly.

14. The floor cleaner in accordance with claim 1, wherein the transmission unit is configured to emit the radiation in the shape of a fan.

15. The floor cleaner in accordance with claim 1, wherein the transmission unit is configured to emit the radiation in at least one plane.

16. The floor cleaner in accordance with claim 15, wherein the transmission unit is configured to emit the radiation in at least one of a vertical plane and a plane inclined relative to the horizontal in the direction towards the floor surface, a line of intersection of the plane of the emission with the horizontal being aligned transversely to a longitudinal direction of the floor cleaner.

17. The floor cleaner in accordance with claim 15, wherein the transmission unit is configured to emit the radiation in a plane aligned at an incline and transversely to a longitudinal direction of the floor cleaner and/or wherein during straight-ahead travel of the floor cleaner, the radiation is directed at an area located in front of the floor cleaner.

18. The floor cleaner in accordance with claim 1, wherein the transmission unit and the detection unit emit radiation and detect reflected radiation, respectively, using light-section technology.

19. The floor cleaner in accordance with claim 1, wherein the drive unit is actuatable to move the floor cleaner during the cleaning of the floor surface section parallel to the obstacle.

20. The floor cleaner in accordance with claim 1, wherein during a movement of the floor cleaner cleaning the floor surface, radiation is emittable and detectable and the presence of the space is determinable.

21. The floor cleaner in accordance with claim 1, wherein at least one of a dirt pick-up device and at least one circular broom with cleaning bristles is provided as the at least one cleaning unit, said dirt pick-up device and said cleaning bristles, respectively, protruding at least partially over an outer contour of the floor cleaner in order to reach into the space.

22. The floor cleaner in accordance with claim 1, wherein at least one cleaning unit is held so as to be movable on the floor cleaner and is able to be moved out relative to a housing of the floor cleaner in order to reach into the space.

23. The floor cleaner in accordance with claim 22, wherein the at least one cleaning unit is mounted on the floor cleaner for moving out in at least one of a displaceable and pivotable manner.

24. The floor cleaner in accordance with claim 1, wherein the floor cleaner comprises a drive unit coupled to the control unit for moving out the at least one cleaning unit relative to the floor cleaner.

25. The floor cleaner in accordance with claim 1, wherein the floor cleaner is a scrubbing-suction machine, a sweeping-suction machine, a sweeping-scrubbing-suction machine or a suction machine.

26. A method for cleaning a floor surface of a room with a self-propelled and self-steering floor cleaner, at least a section or sections of an obstacle located inside the room not being in contact with the floor surface, the obstacle being of such low height that the floor cleaner cannot move under the obstacle, wherein radiation is emitted in the direction of the obstacle and the floor surface in order to spatially scan these, reflected radiation is detected and a detection signal relating thereto is provided, and it is determined whether a space is present between the obstacle and the floor surface and, if so, a floor surface section located underneath the obstacle is regarded as cleanable and is cleaned, with at least one cleaning unit of the floor cleaner reaching into the space,
wherein the floor cleaner is moved at a predetermined or predeterminable distance from the obstacle during cleaning of the floor surface section.

* * * * *